(12) United States Patent
Choi

(10) Patent No.: US 8,787,950 B2
(45) Date of Patent: Jul. 22, 2014

(54) MOBILE TERMINAL AND METHOD FOR TRANSMITTING MESSAGE THEREOF

(75) Inventor: Won Kyoung Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 13/011,123

(22) Filed: Jan. 21, 2011

(65) Prior Publication Data

US 2011/0183660 A1 Jul. 28, 2011

(30) Foreign Application Priority Data

Jan. 22, 2010 (KR) ........................ 10-2010-0005866

(51) Int. Cl.
*H04W 4/12* (2009.01)

(52) U.S. Cl.
USPC ...................... 455/466; 455/552.1; 455/422.1

(58) Field of Classification Search
CPC .......... H04W 4/12; H04W 4/14; H04W 88/06
USPC ............... 455/422.1, 552.1, 557, 414.4, 41.2, 455/466; 370/395.52, 466
See application file for complete search history.

(56) References Cited

U.S. PATENT DOCUMENTS

| | | | |
|---|---|---|---|
| 7,502,621 B2 * | 3/2009 | Lee ............................... | 455/466 |
| 2007/0150444 A1 * | 6/2007 | Chesnais et al. .................. | 707/3 |
| 2008/0167058 A1 * | 7/2008 | Lee et al. ....................... | 455/466 |
| 2009/0051510 A1 * | 2/2009 | Follmer et al. ............. | 340/425.5 |
| 2009/0186651 A1 * | 7/2009 | You ............................. | 455/552.1 |
| 2010/0167763 A1 * | 7/2010 | Bouthemy et al. ............ | 455/466 |

* cited by examiner

*Primary Examiner* — Allahyar Kasraian
*Assistant Examiner* — Farideh Madani
(74) *Attorney, Agent, or Firm* — Jefferson IP Law, LLP

(57) ABSTRACT

A mobile terminal and a method for transmitting a message thereof are provided. The method for transmitting a message in a mobile terminal including at least two communication units capable of communicating with different communication networks, includes, identifying circuits connected through the at least two communication units when at least two identification information of other mobile terminals to which the message is to be transmitted is input, and simultaneously transmitting the message to the at least two other mobile terminals according to the identification information through the identified circuits. Through the method, a message can be simultaneously transmitted to a plurality of other mobile terminals using characteristics of a multi-standby mobile terminal. In addition, the message transmission method can reduce a time required to transmit a message.

14 Claims, 3 Drawing Sheets

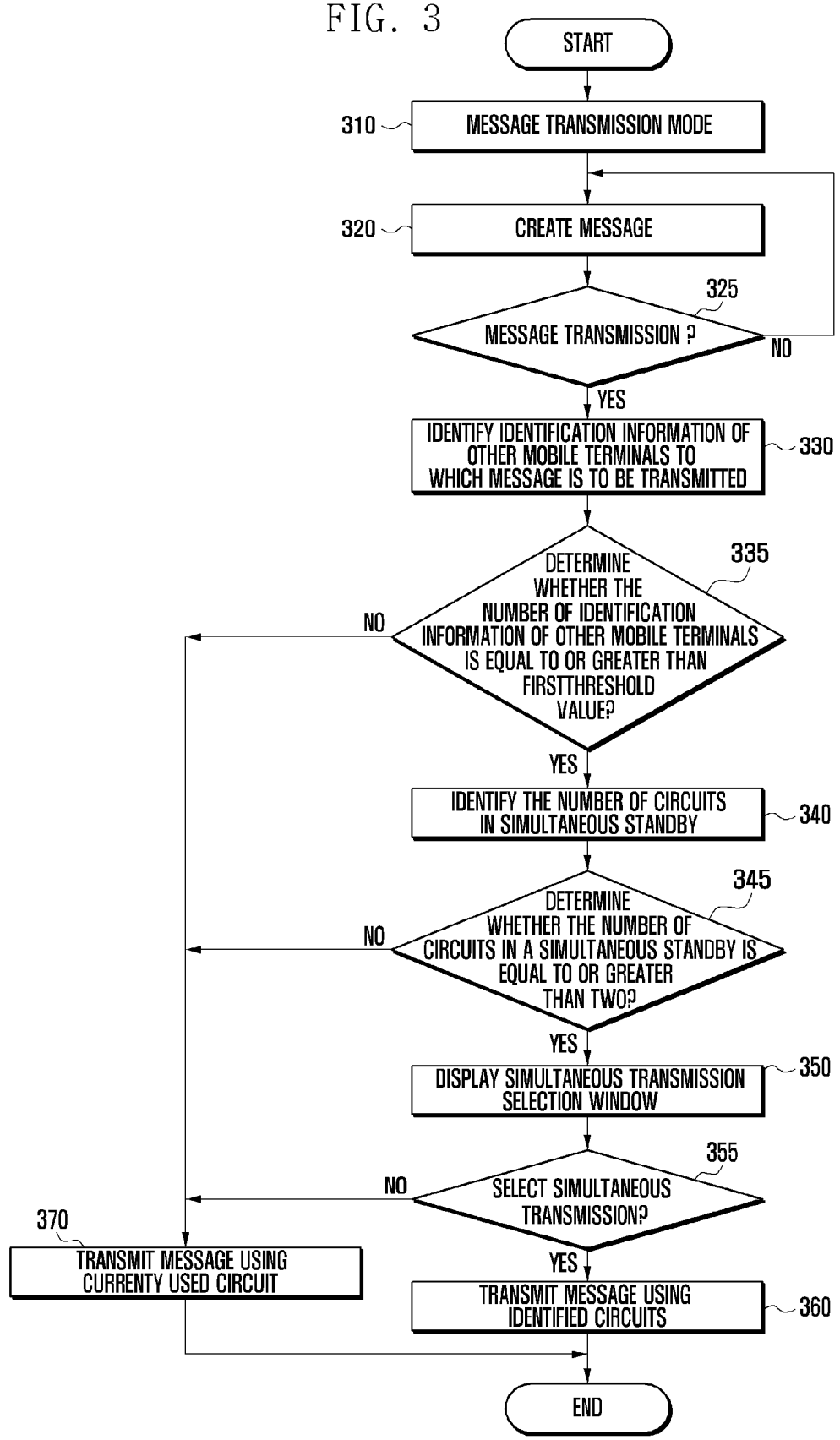

MOBILE TERMINAL AND METHOD FOR TRANSMITTING MESSAGE THEREOF

PRIORITY

This application claims the benefit under 35 U.S.C. §119(a) of a Korean patent application filed on Jan. 22, 2010 in the Korean Intellectual Property Office and assigned Serial No. 10-2010-0005866, the entire disclosure of which is hereby incorporated by reference.

BACKGROUND OF THE INVENTION

1. Field of the Invention

The present invention relates to a mobile terminal and a method for transmitting a message thereof. More particularly, the present invention relates to a method for transmitting a message to a plurality of mobile terminals, and a mobile terminal performing the same.

2. Description of the Related Art

With the advancements in wireless communication technologies, a mobile terminal has been developed that provides various functions, such as a voice call, a short message service function, a video call, an electronic dictionary function, and an Internet function. In addition, a multi-standby terminal capable of communicating with at least two types of a wireless communication networks has been developed. Accordingly, a user can use a communication function of either of the communication networks using one mobile terminal in an area where a plurality of communication networks can be accessed.

In general, when a user simultaneously transmits a message to a plurality of other users, a mobile terminal transmits the message using one communication line that is currently established for communication via a communication network. As illustrated above, when a user transmits the message to plural other mobile terminals through one communication line, the mobile terminal sequentially transmits the messages to the corresponding other mobile terminals. Since the messages are sequentially transmitted, a problem occurs in that a transmission time of the message is long.

SUMMARY OF THE INVENTION

An aspect of the present invention is to address at least the above-mentioned problems and/or disadvantages and to provide at least the advantages described below. Accordingly, an aspect of the present invention is to provide a mobile terminal and a method for transmitting a message thereof.

In accordance with an aspect of the present invention, a method for transmitting a message in a mobile terminal including at least two communication units capable of communicating with different communication networks is provided. The method includes, identifying circuits connected through the at least two communication units when at least two identification information of other mobile terminals to which the message is to be transmitted is input, and simultaneously transmitting the message to the at least two other mobile terminals according to the identification information through the identified circuits.

In accordance with another aspect of the present invention, a mobile terminal for transmitting a message is provided. The terminal includes, at least two communication units for transmitting the message to at least two other mobile terminals through respective circuits connected to at least two communication networks, and a control unit for identifying connected circuits through the at least two communication units and for controlling the simultaneously transmission of the message to the at least two other mobile terminals through the identified circuits when at least two identification information of the at least two other mobile terminals to which the message is to be transmitted is input.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a flowchart illustrating a method for transmitting a message according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
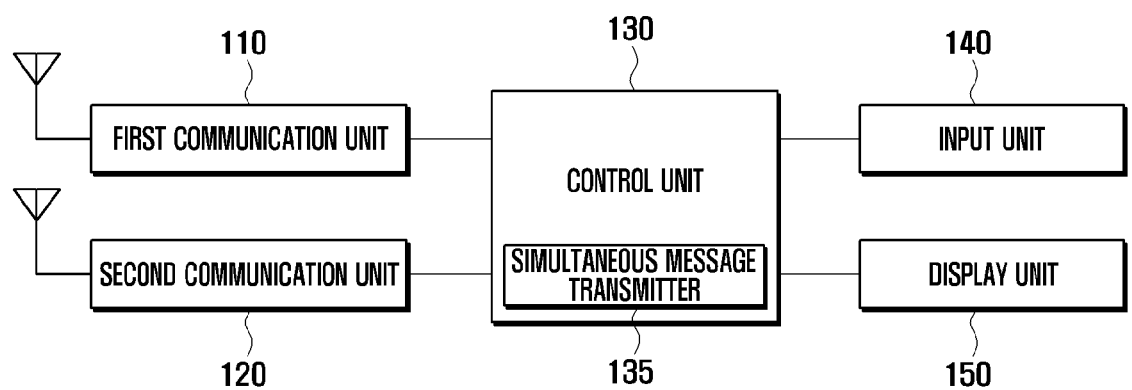
FIG. 1 is a block diagram schematically illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to a detailed description of exemplary embodiments of the present invention, hereinafter, for convenience in description, a dual standby terminal being a multi-standby mobile terminal is described according to an exemplary embodiment of the present invention. However, the present invention is not limited thereto.

That is, a multi-standby terminal according to an exemplary embodiment of the present invention can communicate with at least two wireless communication networks among various wireless communication networks such as Code Division Multiple Access (CDMA), Global System for Mobile communication (GSM), General Packet Radio Service (GPRS), Enhanced Data GSM Environment (EDGE), Universal Mobile Telecommunications System (UMTS), Wideband Code Division Multiple Access (WCDMA) and 3rd Generation Partnership Project (3GPP), and extended and modified networks thereof, and is variously applicable to multi-standby terminals using Universal Subscriber Identity Module (USIM). The multi-standby terminal can also be designed to be capable of communicating with a wireless communication network of the same scheme. For example, the multi-standby terminal may simultaneously use a CDMA wireless communication network and a GSM wireless communication network.

Further, the term 'circuit' denotes a communication channel formed to transmit and receive data between a mobile terminal and a communication network.

Exemplary embodiments of the present invention are described herein with reference to the accompanying drawings. The same reference numbers are used throughout the drawings to refer to the same or like parts. Detailed descriptions of well-known functions and structures incorporated herein may be omitted to avoid obscuring the subject matter of the present invention.

FIG. 1 is a block diagram schematically illustrating a configuration of a mobile terminal according to an exemplary embodiment of the present invention.

Referring to FIG. 1, the mobile terminal includes a first communication unit 110, a second communication unit 120, a control unit 130, an input unit 140, and a display unit 150.

Each of the first communication unit 110 and the second communication unit 120 establishes a circuit with a certain wireless communication network, and transmits/receives all types of data through the established circuit. Each of the first communication unit 110 and the second communication unit 120 may include a transmitting/receiving divider for dividing a wireless signal into a transmitting signal and for a receiving signal, an Radio Frequency (RF) transmitter (not shown) for up-converting a frequency of a transmitted signal and for amplifying the signal, and an RF receiver (not shown) for low-noise-amplifying a received signal and for down-converting the signal. Here, the first communication unit 110 and the second communication unit 120 may support different wireless communication schemes. For example, the first communication unit 10 may support a CDMA scheme and the second communication unit 120 may support a GSM scheme. However, the present invention is not limited thereto. In other words, the first communication unit 110 and the second communication unit 120 may support various communication schemes such as a GSM scheme, a CDMA scheme, a combination of the CDMA scheme and a WCDMA scheme, and a combination of the CDMA scheme and the GSM scheme. Moreover, FIG. 1 shows that the first communication unit 110 and the second communication unit 120 use a separate antenna. However, the present invention is not limited thereto.

In other words, an antenna of the first communication unit 110 and an antenna of the second communication unit 120 can be configured to use a common antenna. Further, the first communication 110 and the second communication 120 connect respective circuits to transmit or receive data to or from a specific wireless communication network according to a supportable communication scheme. In a message transmission mode, the first communication unit 110 and the second communication unit 120 may simultaneously transmit a message to at least two other mobile terminals using at least two connected circuits under the control of the control unit 130.

The control unit 130 controls overall operations of the mobile terminal and a signal flow between internal blocks of the mobile terminal. Further, the control unit 130 can be configured by a first control unit (not shown) for controlling a specific wireless communication scheme through the first communication unit 110 and a second control unit (not shown) for controlling a specific wireless communication scheme through the second communication unit 110. In this case, one of the first control unit or the second unit becomes a main controller and the other becomes a sub-controller. In this case, it is assumed that the control unit 130 is configured to control at least two communication units.

The control unit 130 controls the first communication unit 110 and the second communication unit 120 to establish a circuit by wireless communication networks to transmit and receive data. In a message transmission mode, when identification information capable of identifying at least two other mobile terminals are input, the control unit 130 simultaneously transmits a message to at least two other mobile terminals using a plurality of circuits connected through the first communication unit 110 and the second communication unit 120 according to the input identification information. To do this, the control unit 130 further includes a simultaneous message transmitter 135.

In a message transmission mode, the simultaneous message transmitter 135 determines whether an input message is transmitted to at least two other mobile terminals. When the input message is transmitted to at least two other mobile terminals, the simultaneous message transmitter 135 controls the first communication unit 110 and the second communication unit 120 to identify the number of circuits connected to a current communication network. That is, the simultaneous message transmitter 135 is connected to a current communication network through the first communication unit 110 and the second communication unit 120, and determines the number of circuits capable of transmitting data. Further, when a simultaneous transmission is selected by a user selection, the simultaneous message transmitter 135 uses all identified circuits to simultaneously transmit the message to a plurality of other mobile terminals.

In this case, there are two methods for transmitting a message using a plurality of circuits. One method involves transmitting a message by circuits according to a transmission speed of the circuits. In this method, the transmission speed of each circuit is identified, and the number of messages transmitted through each circuit depends on the transmission speed of the circuit. Here, the faster the transmission speed of the circuit, the greater the number of messages transmitted through the circuit. Next, the other method involves calculating the number of other mobile terminals to which the message is to be transmitted, dividing the number of other mobile terminals by the number of identified circuits, and transmitting the message though each circuit by the calculated number of times. To do this, the simultaneous message transmitter 135 identifies the number of the other mobile terminals to which the message is to be transmitted based on their identification information, and divides the identified number of the other mobile terminals to which the message is to be transmitted by the number of circuits in order to calculate the number of messages per circuit as a calculated value. Moreover, the simultaneous message transmitter 135 controls the first communication unit 110 and the second communication unit 120 to distribute identification information of other mobile terminals by circuits to which a message will be transmitted according to the calculated transmission number.

Accordingly, the first communication unit 110 and the second communication unit 120 transmit a message according to identification information of other mobile terminals distributed among the circuits. Here, the identification information may be a phone number, an Internet Protocol (IP) address, or an electronic mail address to identify other mobile terminals.

The input unit 140 transfers numeral or character information input from a user, and an input signal related to function control of a mobile terminal, such as the setting of all types of functions, to the control unit 130. The input unit 140 can be configured as a touch screen or a key pad. The input unit 140 may include character keys composed of numerals keys and characters keys, function keys capable of selecting functions, and soft keys. Here, in a mode in which a message is created, the input unit 140 can transfer an input signal to the control unit 130 according to the identification information of another mobile terminal to which characters and messages will be transmitted.

The display unit 150 displays all types of menus of a mobile terminal, information input by the user, and information provided to the user. The display unit 150 can be configured to implement a Liquid Crystal Display (LCD). Moreover, the display unit 150 may display a message input by a user and identification information of another mobile terminal to which the message is transmitted. In addition, the display unit 150 may display a simultaneous transmission selection window that enables a user to select simultaneous transmission of a message to a plurality of other mobile terminals.

Although not shown in the drawings, a first card slot and a second card slot may be further provided in the mobile terminal. A user identification card storing identification information for communicating with another communication network is inserted in the first card slot and the second card slot. The first card slot and the second card slot are electrically connected to the control unit 130. The first card slot and the second card slot may include connectors for electric connection with a user identification card.

The user identification card inserted in the first card slot and the second card slot may be a Subscriber Identity Module (SIM), a User Identity Module (UIM), or a USIM. Here, a card supporting a CDMA scheme and a card supporting a GSM scheme can be inserted in the first card slot and the second card slot, respectively. When a dual user identification card supporting both of a GSM scheme and a CDMA scheme is used, the first card slot and the second card slot can be configured by one card slot.

Meanwhile, although not shown in drawings, the mobile terminal may include a camera unit, a digital broadcast receiving unit, an audio processing unit composed of a speaker and a microphone, a connection terminal for data exchange with another terminal, a charging terminal, and a digital sound source reproducing unit, such as an Moving Picture Experts Group (MPEG)-1 or MPEG-2 Audio Layer 3 (MP3) module.

Figure 2:
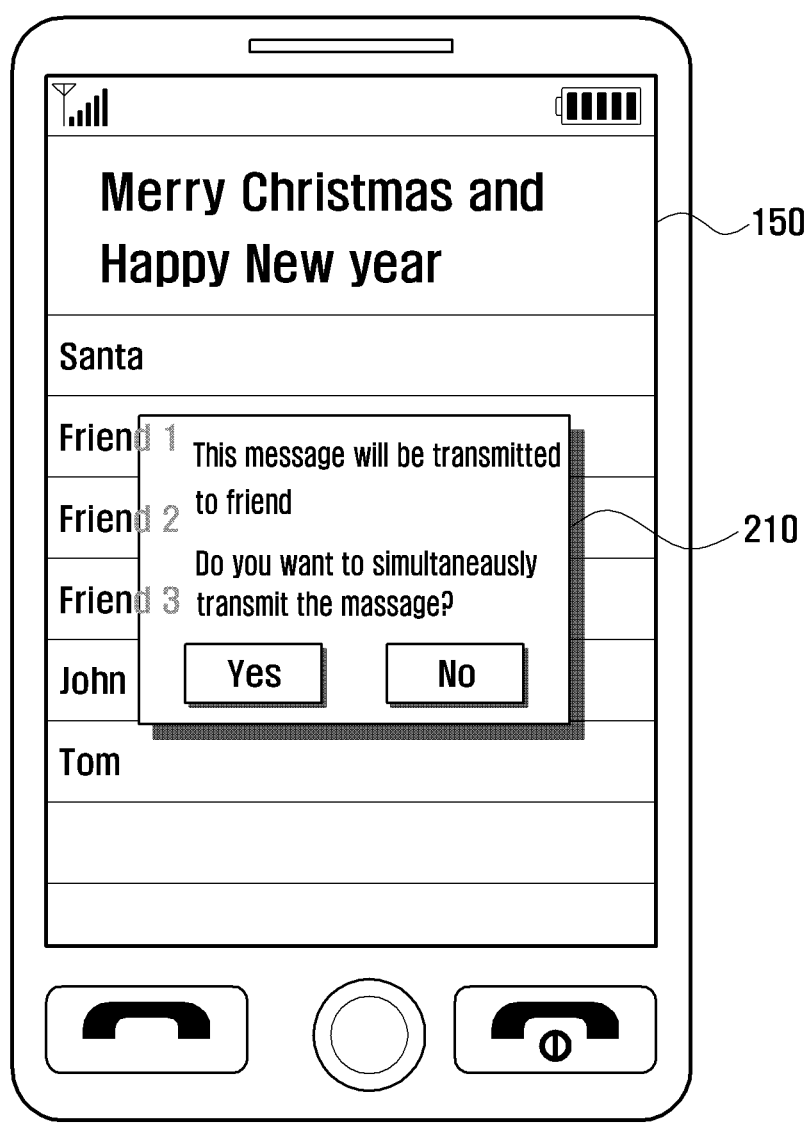
FIG. 2 is a view illustrating a screen for transmitting a message to a plurality of mobile terminals according to an exemplary embodiment of the present invention.

FIG. 2 is a view illustrating a screen for transmitting a message to a plurality of mobile terminals according to an exemplary embodiment of the present invention.

Referring to FIG. 2, when a mobile terminal receives identification information of a plurality of other mobile terminals in a message transmission mode, the mobile terminal displays a simultaneous transmission selection window 210 that enables a user to select whether to simultaneously transmit a message to a plurality of other mobile terminals on a display unit 150. The user can select whether to simultaneously transmit a message to a plurality of other mobile terminals through the displayed simultaneous transmission window 210.

Hereinafter, a method for simultaneously transmitting a message to a plurality of other mobile terminals will be explained with reference to FIG. 3.

FIG. 3 is a flowchart illustrating a method for transmitting a message according to an exemplary embodiment of the present invention.

Referring to FIG. 3, a control unit 130 initiates a message transmission mode according to a user selection in step 310. Next, when a user creates a message, the control unit 130 displays the created message on a display unit 150 in step 320. Subsequently, the control unit 130 determines whether message transmission is selected by the user in step 325.

When message transmission is selected, the control unit 130 identifies identification information of other mobile terminals to which a message is to be transmitted in step 330. Here, the identification information of the other mobile terminals can be previously input before creation of the message to be transmitted or can be input after creation of the message. The following is a description of a case where the identification information of the other mobile terminals is input after creation of the message. First, the control unit 130 determines whether message transmission is selected by the user after a message input by the user is displayed. When the message transmission is selected, the control unit 130 displays an input window capable of inputting identification information of the other mobile terminals to which a message is to be transmitted on a display unit 150. In addition, the control unit 130 identifies identification information of the other mobile terminals input by the user. At this time, the control unit 130 also identifies the input number of identification information of the other mobile terminals.

Subsequently, the control unit 130 determines whether the number of identification information of the other mobile terminals to which a message is to be transmitted is equal to or greater than a first threshold value previously set in step 335. Here, the first threshold value is a set value to determine whether to simultaneously transmit the message. The first threshold value can be set by a user, a manufacturing company, or a communication service provider of the mobile terminal. It is preferred that the first threshold value is equal to or greater than two.

If the number of the identification information of the other mobile terminals is equal to or greater than the first threshold value, the control unit 130 controls the first communication unit 110 and the second communication unit 120 to identify circuits in simultaneous standby and the number thereof in step 340. In other words, the control unit 130 identifies the number of all circuits connected to transmit and receive data to and from a communication network through the first communication unit 110 or the second communication unit 120.

The control unit 130 determines whether the identified number of circuits in simultaneous standby is equal to or greater than two in step 345. When the identified number of circuits in simultaneous standby is equal to or greater than two, the control unit 130 controls the display unit 150 to display a simultaneous transmission selection window on a display unit 150 in step 350. In this case, the simultaneous transmission selection window allows a user to select simultaneous transmission in order to simultaneously transmit a message to a plurality of other mobile terminals.

The control unit 130 determines whether simultaneous transmission is selected by the user on the simultaneous transmission selection window 210 displayed on the display unit 150 in step 355. When the simultaneous transmission is selected, the control unit 130 transmits the message using the identified circuits in step 360. Here, there may be a method for sequentially transmitting a message by identified circuits, and a method for transmitting a message by circuits according to the calculated transmission number according to the number of identification information of the other mobile terminals to which the number of circuits and a message are transmitted.

When the number of identification information of the other mobile terminals to be transmitted at step 335 is less than the first threshold value, the number of circuits in simultaneous standby is less than two at step 345, or the simultaneous transmission is not selected at step 355, the control unit 130 transmits a message to a plurality of other mobile terminals through a currently used circuit in step 370.

Here, when a mobile terminal transmits a message to a plurality of other mobile terminals, it transmits identification number thereof together therewith. In this case, the identification information of the mobile terminals can be set to a specific number according to a type of the message or characteristics of a connected communication network.

In exemplary embodiments of the present invention, a message can be simultaneously transmitted to a plurality of other mobile terminals using an advantage of a multi-standby mobile terminal capable of communicating with a plurality of communication networks. In addition, the message transmission method can reduce a time required to transmit a message.

While the present invention has been shown and described with reference to certain exemplary embodiments thereof, it will be understood by to those skilled in the art that various changes in form and details may be made therein without departing from the spirit and scope of the invention as defined by the appended claims and their equivalents.

What is claimed is:

1. A method for transmitting a message in a mobile terminal including at least two communication units capable of communicating with different communication networks, the method comprising:
   inputting a message to be transmitted;
   inputting at least two identification information of at least two other mobile terminals as destinations of the message to be transmitted;
   identifying at least two circuits connected respectively through the at least two communication units when the at least two identification information of the at least two other mobile terminals to which the message is to be transmitted is input, each of the at least two other mobile terminals corresponding to a respective one of the at least two communication units and corresponding circuits; and
   simultaneously transmitting the message to the at least two other mobile terminals according to the respective identification information through the respective identified circuits.

2. The method of claim 1, where the simultaneously transmitting of the message comprises:
   determining a respective transmission speed of each of the identified circuits; and
   transmitting the message more times through a circuit having a faster transmission speed.

3. The method of claim 1, where the simultaneously transmitting of the message comprises;
   determining a number of input identification information;
   dividing the determined number of input identification information by a number of identified circuits to obtain a calculation value; and
   transmitting the message through each identified circuit a number of times corresponding to the calculation value.

4. The method of claim 1, wherein the identifying of the connected circuits further comprises displaying a simultaneous transmission selection window for selection by a user of the simultaneous transmission of the message to at least two other mobile terminals.

5. The method of claim 4, further comprising:
   determining whether a number of identified circuits is equal to or greater than two,
   wherein the simultaneous transmission selection window is displayed, if it is determined that the number of identified circuits is equal to or greater than two, and
   wherein the message is transmitted using a currently used circuit, if it is determined that the number of input identification information of the at least two other mobile terminals is not equal to or greater than two.

6. The method of claim 4, further comprising:
   transmitting the message using a currently used circuit, if the user does not select simultaneous transmission.

7. The method of claim 1, further comprising:
   determining whether a number of input identification information of the at least two other mobile terminals is equal to or greater than a threshold,
   wherein the circuits connected through the at least two communication units are identified, if it is determined that the number of input identification information of the at least two other mobile terminals is equal to or greater than the threshold, and
   wherein the message is transmitted using a currently used circuit, if it is determined that the number of input identification information of the at least two other mobile terminals is not equal to or greater than the threshold.

8. A mobile terminal for transmitting a message, the terminal comprising:
   an input unit for inputting a message to be transmitted and at least two identification information of at least two other mobile terminals as destinations of the message to be transmitted;
   at least two communication units for transmitting the message to the at least two other mobile terminals through at least two respective circuits connected to at least two corresponding communication networks, each of the at least two other mobile terminals corresponding to a respective one of the at least two communication units and corresponding communication networks; and
   a control unit for identifying corresponding connected circuits through the at least two communication units and for controlling to simultaneously transmit the message to the at least two other mobile terminals through the identified circuits when the at least two identification information of the at least two other mobile terminals to which the message is to be transmitted is input.

9. The terminal of claim 8, wherein the control unit determines a respective transmission speed of each of the circuits and controls the at least two communication units to transmit the message more times through a circuit having a faster transmission speed.

10. The terminal of claim 8, wherein the control unit determines a number of input identification information, and divides the determined number of input identification information by a number of identified circuits to obtain a calculation value, and transmits the message through each identified circuit a number of times corresponding to the calculation value.

11. The terminal of claim 8, further comprising a display unit for displaying a simultaneous transmission selection window for selection by a user of the simultaneous transmission of the message to the at least two other mobile terminals under the control of the control unit.

12. The terminal of claim 11, wherein the control unit determines whether a number of identified circuits is equal to or greater than two, if it is determined that the number of identified circuits is equal to or greater than two, the simultaneous transmission selection window is displayed, and if it is determined that the number of input identification information of the at least two other mobile terminals is not equal to or greater than two, the message is transmitted using a currently used circuit.

13. The terminal of claim 11, wherein if the user does not select simultaneous transmission, the message is transmitted using a currently used circuit.

14. The terminal of claim 8, wherein the control unit determines whether a number of input identification information of the at least two other mobile terminals is equal to or greater than a threshold, if it is determined that the number of input identification information of the at least two other mobile terminals is equal to or greater than the threshold, the circuits connected through the at least two communication units are identified, and if it is determined that the number of input identification information of the at least two other mobile terminals is not equal to or greater than the threshold, the message is transmitted using a currently used circuit.

* * * * *